United States Patent
Igarashi et al.

(10) Patent No.: US 12,233,750 B2
(45) Date of Patent: Feb. 25, 2025

(54) VEHICLE SYSTEM, CONTROL METHOD OF VEHICLE SYSTEM, AND CONTROL PROGRAM OF VEHICLE SYSTEM

(71) Applicant: HONDA MOTOR CO., LTD., Tokyo (JP)

(72) Inventors: Daishi Igarashi, Wako (JP); Kenji Taruya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 377 days.

(21) Appl. No.: 17/680,352

(22) Filed: Feb. 25, 2022

(65) Prior Publication Data
US 2022/0314817 A1  Oct. 6, 2022

(30) Foreign Application Priority Data
Mar. 30, 2021 (JP) .................. 2021-057430

(51) Int. Cl.
B60L 58/40 (2019.01)

(52) U.S. Cl.
CPC .......... B60L 58/40 (2019.02); *B60L 2200/36* (2013.01); *B60L 2240/36* (2013.01); *B60L 2240/545* (2013.01); *B60L 2240/62* (2013.01)

(58) Field of Classification Search
None
See application file for complete search history.

(56) References Cited

U.S. PATENT DOCUMENTS

| | | | |
|---|---|---|---|
| 2004/0048118 A1* | 3/2004 | Nakaji | B60L 58/33 429/429 |
| 2014/0113161 A1* | 4/2014 | Katano | B60L 1/003 429/9 |
| 2016/0046204 A1* | 2/2016 | Oh | B60L 58/40 701/22 |
| 2017/0355279 A1* | 12/2017 | Matsumoto | B60L 1/003 |
| 2018/0219239 A1* | 8/2018 | Ishikawa | H01M 8/1018 |
| 2020/0207326 A1* | 7/2020 | Wenger | B60W 20/13 |
| 2022/0166042 A1* | 5/2022 | Braun | H01M 8/043 |
| 2023/0075054 A1* | 3/2023 | Haas | B60L 58/40 |
| 2023/0150399 A1* | 5/2023 | Zhou | B60L 58/31 |

FOREIGN PATENT DOCUMENTS

| | | | | |
|---|---|---|---|---|
| CN | 104827922 A | * | 8/2015 | ............. B60L 11/18 |
| CN | 110816315 A | * | 2/2020 | ............. B60L 50/30 |
| DE | 102015010242 A1 | * | 3/2016 | ............. B60L 11/18 |

(Continued)

OTHER PUBLICATIONS

Japanese Office Action for Japanese Patent Application No. 2021-057430 mailed Nov. 8, 2022.

*Primary Examiner* — Amelia Vorce
(74) *Attorney, Agent, or Firm* — Amin, Turocy & Watson, LLP

(57) ABSTRACT

A vehicle system includes a fuel cell system, a battery, a drive device that operates with power, a load different from the drive device, a positional information acquisition unit, a traveling route setting unit, and a control device configured to control power to be supplied to the load from the fuel cell system and the battery based on positional information acquired by the positional information acquisition unit and a traveling route set by the traveling route setting unit.

3 Claims, 10 Drawing Sheets

(56) References Cited

FOREIGN PATENT DOCUMENTS

| | | | | |
|---|---|---|---|---|
| JP | 2000-131083 | | 5/2000 | |
| JP | 2001-183150 | | 7/2001 | |
| JP | 2002-343401 | | 11/2002 | |
| JP | 2004103317 A | * | 4/2004 | .......... B60L 11/1881 |
| JP | 2004158333 A | * | 6/2004 | .............. B60L 58/31 |
| JP | 2010-276357 | | 12/2010 | |
| WO | 2020/152006 | | 7/2020 | |

\* cited by examiner

VEHICLE SYSTEM, CONTROL METHOD OF VEHICLE SYSTEM, AND CONTROL PROGRAM OF VEHICLE SYSTEM

CROSS-REFERENCE TO RELATED APPLICATION

Priority is claimed on Japanese Patent Application No. 2021-057430, filed Mar. 30, 2021, the content of which is incorporated herein by reference.

BACKGROUND OF THE INVENTION

Field of the Invention

The present invention relates to a vehicle system, a control method of a vehicle system, and a control program of a vehicle system.

Description of Related Art

Conventionally, there is a technology related to control of a fuel cell system mounted in a vehicle.

Patent Document 1 (Japanese Unexamined Patent Application, First Publication No. 2002-343401) discloses an energy output device which includes a plurality of energy output sources having fuel cells to provide a technology that suppresses deterioration in energy efficiency due to the consumption of energy when a fuel cell is warmed up and operated or the loss of energy after the fuel cell is stopped. The energy output device includes a determination unit that determines whether the fuel cell needs to be started based on predetermined information input at the time of starting the energy output device as information related to a magnitude of energy required from the start to the stop of the energy output device, and a prohibition unit that prohibits the start of the fuel cell when the determination unit determines that the fuel cell does not need to be started.

Patent Document 2 (Japanese Unexamined Patent Application, First Publication No. 2010-276357) discloses a navigation device for the purpose of providing a navigation device capable of efficiently using a plurality of fuel cells mounted in a vehicle. The navigation device includes a motor that individually drives four or more vehicle wheels, a plurality of fuel cells that supply power for driving the motor, and a drive control unit for controlling drive of the motor. Furthermore, the navigation device has a route guidance unit for searching for a guidance route from a set departure place to a destination and performing route guidance, and a control plan creation unit that, when the guidance route is searched, creates a control plan for each motor such that use ratios of each of the plurality of fuel cells when a host vehicle has finished traveling on the guidance route are equalized.

In a period in which the route guidance is executed, communication with the drive control unit is performed such that drive of the motor is controlled based on the control plan and a current position of the host vehicle.

SUMMARY OF THE INVENTION

The technologies described in Patent Document 1 and Patent Document 2 leave room for improvement in the drive control of the fuel cell system when power is supplied to a load different from a drive device such as a refrigerating device of a refrigerator truck.

The present invention has been made in consideration of such circumstances, and an object thereof is to provide a vehicle system that improves drive control of a fuel cell system when the supply of power to a load different from a drive device is performed, and suppresses deterioration in durability performance of the fuel cell system, a control method of the vehicle system, and a control program of the vehicle system.

A vehicle system, a control method of a vehicle system, and a control program of a vehicle system according to the present invention have adopted the following configuration.

(1) A vehicle system according to one aspect of the present invention includes a fuel cell system, a battery, a drive device that operates with power, a load different from the drive device, a positional information acquisition unit, a traveling route setting unit, and a control device configured to control power to be supplied to the load from the fuel cell system and the battery based on positional information acquired by the positional information acquisition unit and a traveling route set by the traveling route setting unit.

According to the vehicle system, since power to be supplied to a load from the fuel cell system and the battery is adjusted according to a traveling status, it is possible to suppress deterioration in durability performance of the fuel cell system.

(2) In the aspect of (1) described above, the traveling route setting unit may set one of an urban route for traveling an urban area and a non-urban route for traveling a non-urban area.

According to this configuration, since power to be supplied to a load from a fuel cell system and a battery is adjusted based on an area (an urban area) in which parking or stopping of a vehicle is repeated in a short period of time, and an area (a non-urban area) in which traveling of a vehicle is continued, it is possible to suppress deterioration in durability performance of a fuel cell.

(3) In the aspect of (2) described above, the vehicle system may further include a battery temperature information acquisition unit configured to acquire temperature information of the battery, and, when an urban route for traveling an urban area is set by the traveling route setting unit and a temperature of the battery acquired by the battery temperature information acquisition unit is lower than a set predetermined temperature, power may be supplied to the load from both of the fuel cell system and the battery.

According to this configuration, it is possible to warm up the battery early by outputting power from the battery in an area (urban area) in which parking or stopping of a vehicle is repeated in a short period of time, and to also suppress changes in an amount of power to be output from the fuel cell system. For this reason, it is possible to suppress deterioration of the fuel cell system.

(4) In the aspect of (2) described above, the vehicle system may further include a battery temperature information acquisition unit configured to acquire temperature information of the battery, and when an urban route for traveling an urban area is set by the traveling route setting unit and a temperature of the battery acquired by the battery temperature information acquisition unit is equal to or higher than a set predetermined temperature, an operating status of the fuel cell system may be changed according to a remaining capacity of the battery.

According to this configuration, when warm-up of the battery is completed, it is possible to limit an unnecessary operation of the fuel cell system and to suppress deterioration in durability performance of the fuel cell system by controlling an operating state of the fuel cell system according to a remaining capacity of a battery that can supply power to the load.

(5) In the aspect of (4) described above, when a remaining capacity of the battery is higher than a predetermined remaining capacity set based on positional information acquired by the positional information acquisition unit, the fuel cell system may be stopped.

According to this configuration, when there is a sufficient capacity for the remaining capacity of a battery required in association with positional information, it is possible to limit an unnecessary operation of the fuel cell system and to suppress deterioration in durability performance of the fuel cell system by driving a load only with power from the battery.

(6) In the aspect of (4) described above, when a remaining capacity of the battery is lower than a predetermined remaining capacity set based on positional information acquired by the positional information acquisition unit, an output of the fuel cell system may be made to be higher than an output at which efficiency of the fuel cell system is maximized.

According to this configuration, when there is an insufficient capacity for the remaining capacity of a battery required in association with positional information, it is possible to perform charging of the battery and to stably supply power to a load by outputting an increased output of the fuel cell system.

(7) In the aspect of (4) described above, a plurality of fuel cell systems may be included, and when a remaining capacity of the battery is lower than a predetermined remaining capacity set based on positional information acquired by the positional information acquisition unit, the number of operating fuel cell systems may be increased.

According to this configuration, when there is an insufficient capacity for the remaining capacity of a battery required in association with positional information, it is possible to perform charging of the battery and to stably supply power to a load by increasing the number of operating fuel cell systems and outputting power.

(8) In the aspects of (5) to (7) described above, the predetermined remaining capacity may be set based on at least one of positional information acquired by the positional information acquisition unit and a traveling route set by the traveling route setting unit.

According to this configuration, since the remaining capacity of a battery is set according to a method of using a vehicle on a traveling route, it is possible to increase a frequency at which power is supplied to a load from a battery, and to suppress deterioration in the fuel cell system.

(9) In the aspects of (2) to (7) described above, when a non-urban route for traveling a non-urban area is set by the traveling route setting unit, power may be supplied to the load from the fuel cell system and the fuel cell system may be controlled to have a predetermined amount of power generation.

According to this configuration, when travel on a route on which required power of a load continues to be stable for a long period of time is determined, it is possible to suppress deterioration in the fuel cell system by stabilizing an output of the fuel cell system to generate power.

(10) A control method of a vehicle system according to another aspect of the present invention includes, by a computer, controlling power supplied to the load from the fuel cell system and the battery based on positional information acquired by the positional information acquisition unit and a traveling route set by the traveling route setting unit.

According to the control method of a vehicle system of the present aspect, since power to be supplied to a load from the fuel cell system and the battery is adjusted according to a traveling status, it is possible to suppress deterioration in durability performance of the fuel cell system.

(11) A control program of a vehicle system according to still another aspect of the present invention causes a computer to execute controlling power to be supplied to the load from the fuel cell system and the battery based on positional information acquired by the positional information acquisition unit and a traveling route set by the traveling route setting unit.

According to the control program of a vehicle system of the present aspect, since power to be supplied to a load from the fuel cell system and the battery is adjusted according to a traveling status, it is possible to suppress deterioration in durability performance of the fuel cell system.

According to the aspects of (1) to (11) described above, it is possible to improve drive control of the fuel cell system when power is supplied to a load different from a drive device, and to suppress deterioration in durability performance of the fuel cell system.

DETAILED DESCRIPTION OF THE INVENTION

Hereinafter, embodiments of the present invention will be described with reference to the drawings. An electric vehicle in which a vehicle system is mounted is, for example, a fuel cell vehicle in which power generated in fuel cells is used as power for traveling or power for operating in-vehicle devices. The electric vehicle is an example of an electric device operated with power, and is a vehicle such as a two-wheeled vehicle, a three-wheeled vehicle, or a four-wheeled vehicle. The electric vehicle may be, for example, a commercial vehicle such as a bus or a truck in which a plurality of fuel cell systems to be described below can be mounted. The vehicle system may be mounted in an electric device other than the electric vehicle (for example, a trailer), or may be mounted in a stationary fuel cell system.

[Electric Vehicle]

Figure 1:
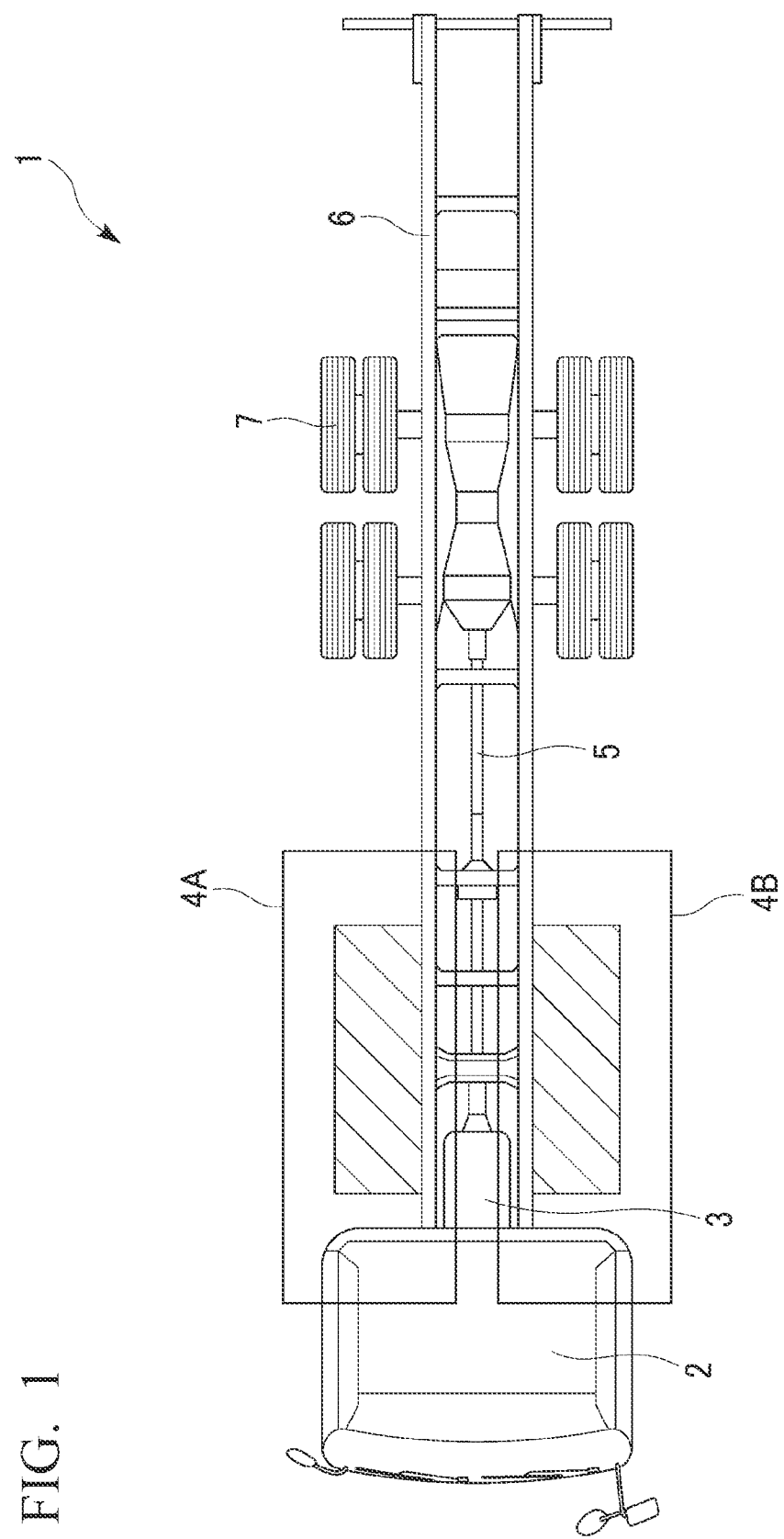
FIG. 1 is a diagram which shows an example of a schematic configuration of an electric vehicle according to an embodiment.

FIG. 1 is a diagram which shows an example of a schematic configuration of an electric vehicle 1 according to the present embodiment. As shown in FIG. 1, the electric vehicle 1 includes a cab bag 2, a transmission 3, a unit 4A, a unit 4B, a shaft 5, a frame 6, and a vehicle wheel 7.

The cab bag 2 is a part including a driver's seat or the like. The transmission 3 is a transmission. The units 4A and 4B include a fuel cell system. In the following description, when one of the units 4A and 4B is not specified, they are each referred to as a unit 4. The shaft 5 is, for example, a propeller shaft, and is a component that connects the transmission 3 and a gear connected to the vehicle wheel 7. The schematic configuration of the electric vehicle 1 shown in FIG. 1 is an example, and the configuration is not limited thereto. For example, the number of units 4 is not limited to two, and may be one or more.

[Unit]

Figure 2:
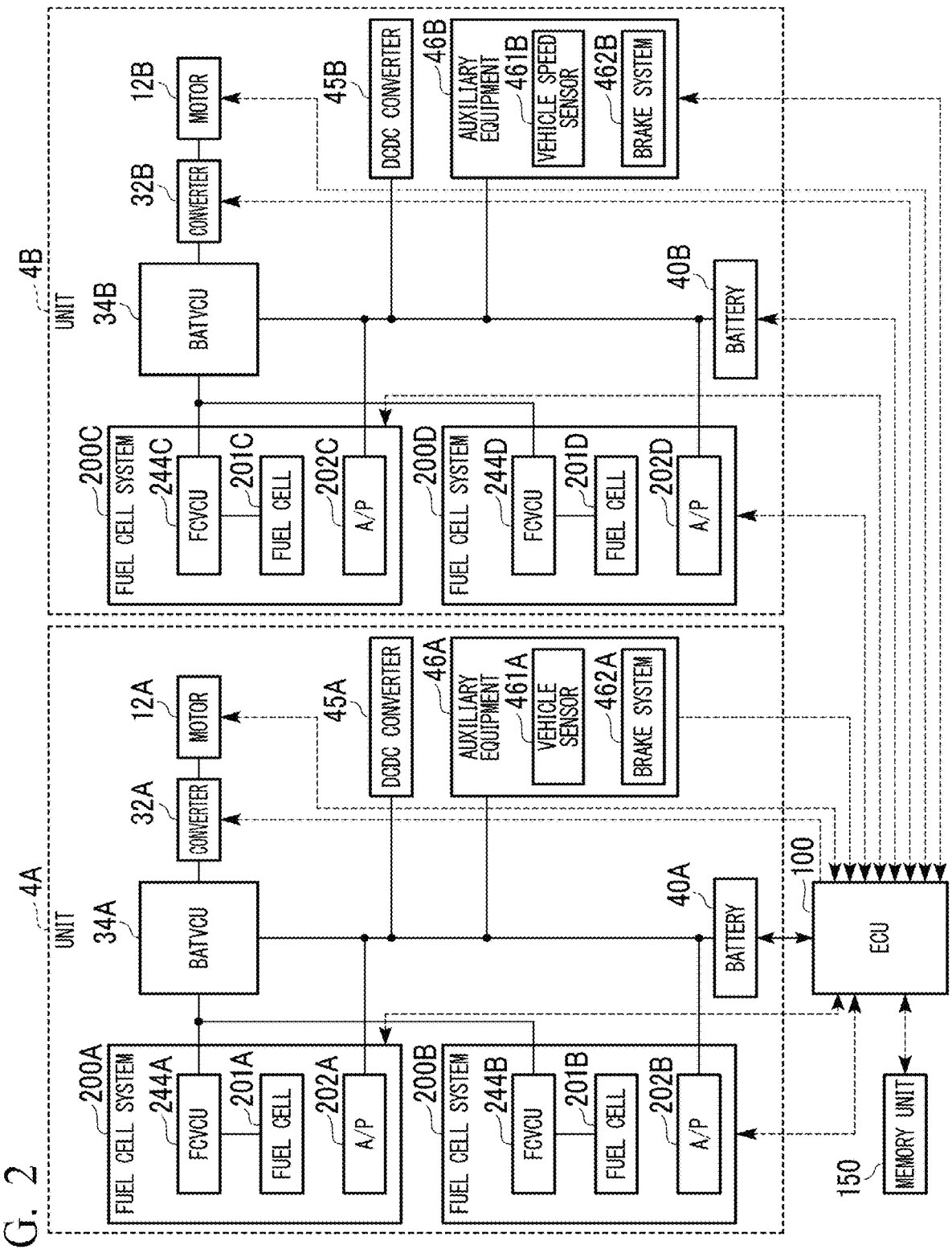
FIG. 2 is a block diagram which shows an example of a configuration including units according to the embodiment.

Next, a configuration example of the unit 4 will be described. FIG. 2 is a block diagram which shows an example of a configuration including the unit 4 according to the present embodiment. As shown in FIG. 2, the unit 4A includes a fuel cell system 200A, a fuel cell system 200B, a BATVCU 34A, a conversion unit 32A, a motor 12A, a DC-DC conversion unit 45A, an auxiliary machine 46A, and a battery 40A. The unit 4B includes a fuel cell system 200C, a fuel cell system 200D, a BATVCU 34B, a conversion unit 32B, a motor 12B, a DC-DC conversion unit 45B, an auxiliary machine 46B, and a battery 40B.

The units 4A and 4B are connected to the ECU 100. A storage unit 150 is connected to the ECU 100. The ECU 100 is an example of a control device or a control unit.

The fuel cell system 200A includes a FCVCU 244A, a fuel cell 201A, and an A/P 202A. The fuel cell system 200B includes an FCVCU 244B, a fuel cell 201B, and an A/P 202B. A fuel cell system 200C includes an FCVCU 244C, a fuel cell 201C, and an A/P 202C. A fuel cell system 200D includes an FCVCU 244D, a fuel cell 201D, and an A/P 202D.

In the following description, when one of the fuel cell system 200A, the fuel cell system 200B, the fuel cell system 200C, and the fuel cell system 200D is not specified, they are each referred to as a fuel cell system 200. When one of the BATVCU 34A and the BATVCU 34B is not specified, they are each referred to as a BATVCU 34. When one of the motor 12A and the motor 12B is not specified, they are each referred to as a motor 12. When one of the control unit 80A and the control unit 80B is not specified, they are each referred to as a control unit 80. When one of the DC-DC conversion unit 45A and the DC-DC conversion unit 45B is not specified, they are each referred to as a DC-DC conversion unit 45. When one of the auxiliary machine 46A and the auxiliary machine 46B is not specified, they are each referred to as an auxiliary machine 46. When one of the battery 40A and the battery 40B is not specified, they are each referred to as a battery 40. When one of the FCVCU 244A, the FCVCU 244B, the FCVCU 244C, and the FCVCU 244D is not specified, they are each referred to as an FCVCU 244. When one of the fuel cell 201A, the fuel cell 201B, the fuel cell 201C, and the fuel cell 201D is not specified, they are each referred to as a fuel cell 201. When one of the A/P 202A, the A/P 202B, the A/P 202C, and the A/P 202D is not specified, they are each referred to as an A/P 202.

The fuel cell voltage control unit (FCVCU) 244 is, for example, a step-up type DC-DC converter that steps up a voltage of the fuel cell 201. The fuel cell 201 is, for example, an energy source using hydrogen as a power generation energy. The A/P 202 is an air pump. A detailed configuration example of the fuel cell system 200 will be described below.

The battery 40 is an energy source, and is a battery capable of repeating charging and discharge, such as, for example, a nickel and hydrogen battery, a lithium-ion secondary battery, a sodium-ion battery, or the like. The battery 40 includes a battery sensor that detects a current value, a voltage value, and a temperature of the battery 40. The battery 40 may be connected to, for example, an external charging facility to performing charging with power supplied from a charge and discharge device.

The battery voltage control unit (BATVCU) 34 is, for example, a step-up type DC-DC converter. The BATVCU 34 steps up a DC voltage supplied from the battery 40 and supplies it to the conversion unit 32. The BATVCU 34 outputs a regenerative voltage supplied from the motor 12 or power supplied from the fuel cell system 200 to the battery 40.

The DC-DC conversion unit 45 performs DC-DC conversion. The DC-DC conversion unit 45 converts, for example, a DC voltage output from the battery 40 into a DC voltage of 12V.

The auxiliary machine 46 is another in-vehicle device or the like, and includes, for example, a vehicle sensor 461 (vehicle sensors 461A and 461B), a brake device 462 (brake devices 462A and 462B), and the like. The vehicle sensor 461 may include an acceleration sensor that detects an acceleration of the electric vehicle 1, a yaw rate sensor that detects an angular speed around a vertical axis, an azimuth sensor that detects an orientation of the electric vehicle 1. The vehicle sensor 461 may include a position sensor (a positional information acquisition unit) that detects a position of the electric vehicle 1. The position sensor acquires positional information of the electric vehicle 1 from, for example, a global navigation satellite system (GNSS) receiver or a global positioning system (GPS) receiver mounted on the electric vehicle 1. The vehicle sensor 461 may include a temperature sensor that measures a temperature of the fuel cell system 200.

The other in-vehicle devices include a traveling route setting unit. The traveling route setting unit sets a traveling route of the electric vehicle 1 to any one of urban routes for traveling an urban area and non-urban routes for traveling a non-urban area.

"Urban area" is an area in which there are consecutive blocks with an average building coverage ratio (a ratio of a total building area of buildings in a block (referring to the smallest housing complex in a residential area surrounded by a road, a river, a park, and the like with a width of 4 meters or more) to an area of the block. The same will be applied hereinafter) of approximately 10% or more, or an area in which two or more quasi-urban areas are in close proximity to each other in a densely populated area of buildings, and population in the area is 10,000 or more (Jan. 20, 2000, Fire and Disaster Management Agency Notification "Firefighting Power Maintenance Guidelines," Article 2). "Non-urban area" refers to areas other than the urban area described above, and includes, for example, suburbs, highways, and general paths.

The other in-vehicle devices include a load different from a drive device. Such a load includes a refrigeration apparatus, an air conditioner, and the like.

The electronic control unit (ECU) 100 controls, for example, each fuel cell system 200 based on a state of the fuel cell system 200, a state of the battery 40, and power required by the fuel cell system 200. The ECU 100 compares, for example, the required power and a threshold value stored in the storage unit 150, and controls each fuel cell system 200 based on a result of the comparison. The ECU 100 compares the state of the battery 40 and the threshold value of the storage unit 150, and controls each fuel cell system 200 based on a result of the comparison. A control method example will be described below. The ECU 100 controls the conversion unit 32A, the motor 12A, the conversion unit 32B, and the motor 12B. The unit 4A may include the control unit 80A (80, not shown), and the unit 4B may include the control unit 80B (80, not shown). In this case, a control unit of the unit 4A may control the conversion unit 32A and the motor 12A according to the control of the ECU 100. A control unit of the unit 4B may control the conversion unit 32B and the motor 12A according to the control of the ECU 100.

The storage unit 150 stores, for example, various threshold values used when the ECU 100 performs control, a program used when the ECU 100 performs control, and the like. The storage unit 150 is realized by, for example, a hard disk drive (HDD), a flash memory, an electrically erasable programmable read only memory (EEPROM), a read only memory (ROM), or a random access memory (RAM).

The ECU 100 is realized by, for example, a hardware processor such as a central processing unit (CPU) executing a program (software). Some or all of these components may be realized by hardware (a circuit unit; including circuitry) such as large scale integration (LSI), an application specific integrated circuit (ASIC), a field-programmable gate array (FPGA), or a graphics processing unit (GPU), or may be realized by software and hardware in cooperation. A program may be stored in advance in a storage device (a storage device having a non-transitory storage medium) such as an HDD or flash memory of the electric vehicle 1, or may be stored in a detachable storage medium such as a DVD or a CD-ROM and installed in the HDD or flash memory which is, for example, the storage unit 150 by the storage medium (non-transitory storage medium) being attached to a drive device.

[Fuel Cell System]

Figure 3:
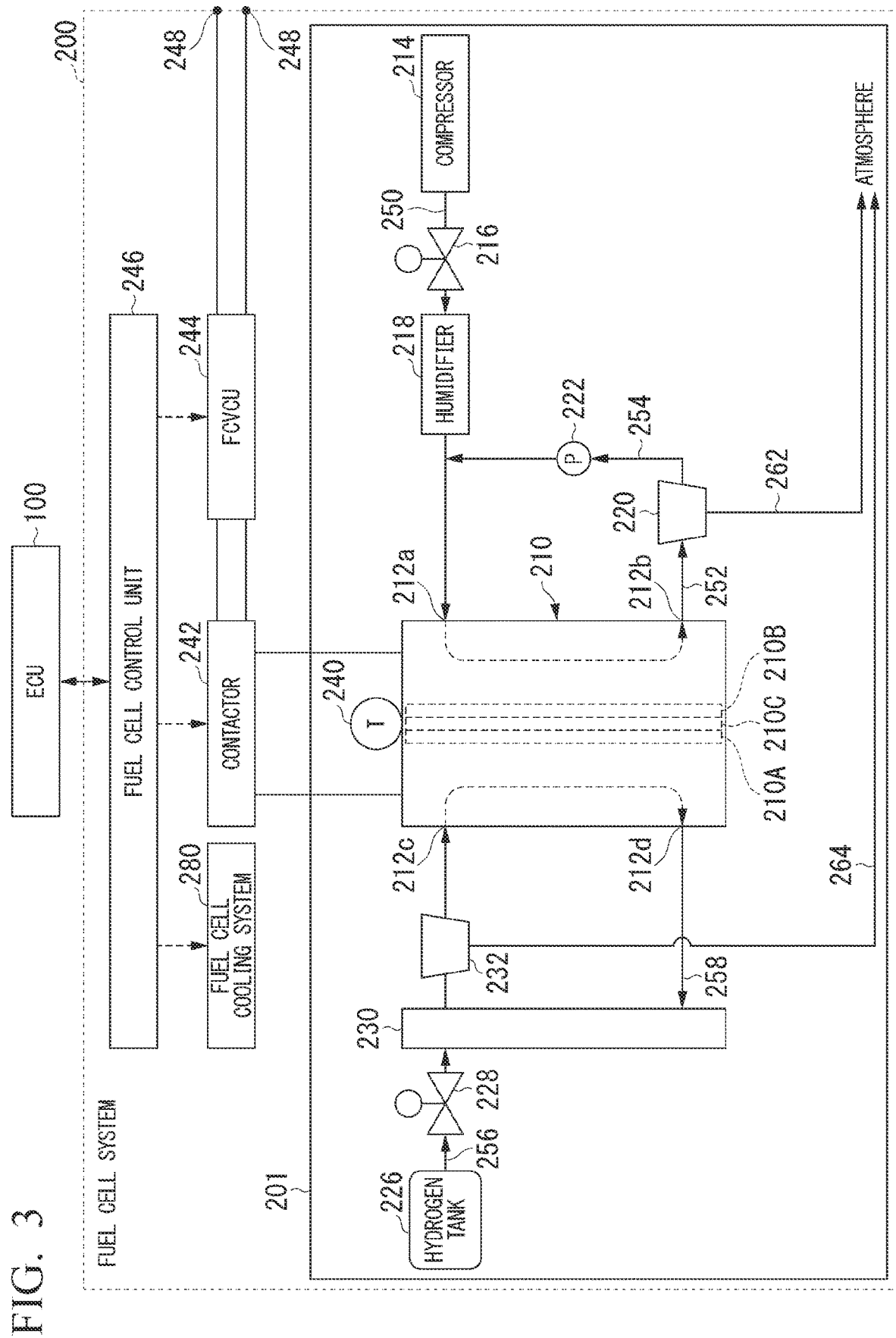
FIG. 3 is a diagram which shows an example of a configuration of a fuel cell system according to the embodiment.

Here, a configuration example of the fuel cell system 200 will be described. FIG. 3 is a diagram which shows an example of a configuration of the fuel cell system 200 according to the present embodiment. As shown in FIG. 2, the fuel cell system 200 includes, for example, a fuel cell stack 210, a compressor 214, a sealing inlet valve 216, a humidifier 218, a gas-liquid separator 220, an exhaust circulation pump (P) 222, a hydrogen tank 226, a hydrogen supply valve 228, a hydrogen circulation unit 230, a gas-liquid separator 232, a temperature sensor (T) 240, a contactor 242, an FCVCU 244, a fuel cell control device 246, and a fuel cell cooling system 280. The configuration in FIG. 3 is an example, and the configuration of the fuel cell system 200 is not limited to this.

The compressor 214 includes a motor or the like which is driven and controlled by the fuel cell control device 246, takes in air from the outside by driving force of the motor, and compresses it. The compressor 214 sends the compressed air into the oxidant gas supply path 250 connected to a cathode 210B, and thereby it pumps an oxidizing gas to fuel cells.

The sealing inlet valve 216 is provided in the oxidant gas supply path 250 for connecting the compressor 214 and a cathode supply port 212a capable of supplying air to the cathode 210B of the fuel cell stack 210. The sealing inlet valve 216 is opened and closed by control of the fuel cell control device 246.

The humidifier 218 humidifies the air sent from the compressor 214 into the oxidant gas supply path 250. For example, the humidifier 218 includes, for example, a water permeable membrane such as a hollow fiber membrane, and brings the air from the compressor 214 into contact with water through the water permeable membrane, thereby adding moisture to the air to humidify the air.

The gas-liquid separator 220 discharges a cathode exhaust gas discharged from a cathode discharge port 212b to an oxidant gas discharge path 252 without being consumed by the cathode 210B and liquid water into the atmosphere through the exhaust path 262 of the cathode. The gas-liquid separator 220 may separate the cathode exhaust gas discharged to the oxidant gas discharge path 252 from the liquid water and cause only the separated cathode exhaust gas to flow in an exhaust gas recirculation path 254.

An exhaust circulation pump 222 is provided in the exhaust gas recirculation path 254. The exhaust circulation pump 222 mixes the cathode exhaust gas flowing from the gas-liquid separator 220 to the exhaust gas recirculation path 254 with an air flowing through the oxidant gas supply path 250 from the sealing inlet valve 216 toward the cathode supply port 212a, and supplies the mixture to the cathode 210B again.

The hydrogen tank 226 stores hydrogen in a compressed state. The hydrogen supply valve 228 is provided in the fuel gas supply path 256 that connects the hydrogen tank 226 and an anode supply port 212c capable of supplying hydrogen to an anode 210A of the fuel cell stack 210. The hydrogen supply valve 228 supplies the hydrogen stored in the hydrogen tank 226 to the fuel gas supply path 256 when it is opened by the control of the fuel cell control device 246.

The hydrogen circulation unit 230 is, for example, a pump that circulates and supplies a fuel gas to the fuel cell 201. The hydrogen circulation unit 230 causes, for example, an anode exhaust gas discharged from the anode discharge port 212d to the fuel gas discharge path 258 without being consumed by the anode 210A to circulate through the fuel gas supply path 256 running into the gas-liquid separator 232.

The gas-liquid separator 232 separates the anode exhaust gas circulating from the fuel gas discharge path 258 to the fuel gas supply path 256 by an action of the hydrogen circulation unit 230 from liquid water. The gas-liquid separator 232 supplies the anode exhaust gas separated from the liquid water to the anode supply port 212c of the fuel cell stack 210. The liquid water discharged to the gas-liquid separator 232 is discharged to the atmosphere through a drain pipe 264.

A temperature sensor 240 detects the temperatures of the anode 210A and the cathode 210B of the fuel cell stack 210, and outputs a detection signal (temperature information) to the fuel cell control device 246.

The contactor 242 is provided between the anode 210A and the cathode 210B of the fuel cell stack 210 and the FCVCU 244. The contactor 242 electrically connects or blocks between the fuel cell stack 210 and the FCVCU 244 based on the control of the fuel cell control device 246.

The FCVCU 244 is disposed between an electrical load and the anode 210A and the cathode 210B of the fuel cell stack 210 via the contactor 242. The FCVCU 244 steps up a voltage of an output terminal 248 connected to an electrical load side to a target voltage determined by the fuel cell control device 246. The FCVCU 244 steps up, for example, a voltage output from the fuel cell stack 210 to the target voltage and outputs it to the output terminal 248.

The fuel cell control device 246 controls a start and an end of power generation, an amount of power generation, and the like in the fuel cell system 200 according to power generation control by the ECU 100. The fuel cell control device 246 performs control for temperature adjustment of the fuel cell system 200 using the fuel cell cooling system 280. The fuel cell control device 246 may be replaced by, for example, a control device such as an FC-ECU. The fuel cell control device 246 may perform power generation control on the electric vehicle 1 in conjunction with the ECU 100.

The fuel cell cooling system 280 cools down the fuel cell system 200 according to control by the fuel cell control device 246, for example, when a temperature of the fuel cell stack 210 detected by the temperature sensor 240 is equal to or greater than a predetermined threshold value. For example, the fuel cell cooling system 280 cools down the temperature of the fuel cell stack 210 by circulating a refrigerant through a flow path provided in the fuel cell stack 210 and discharging a heat of the fuel cell stack 210. The fuel cell cooling system 280 may perform control of heating or cooling down the fuel cell stack 210 such that the temperature detected by the temperature sensor 240 is maintained in a predetermined temperature range when the fuel cell system 200 is in a state of power generation.

[Control Device]

Figure 4:
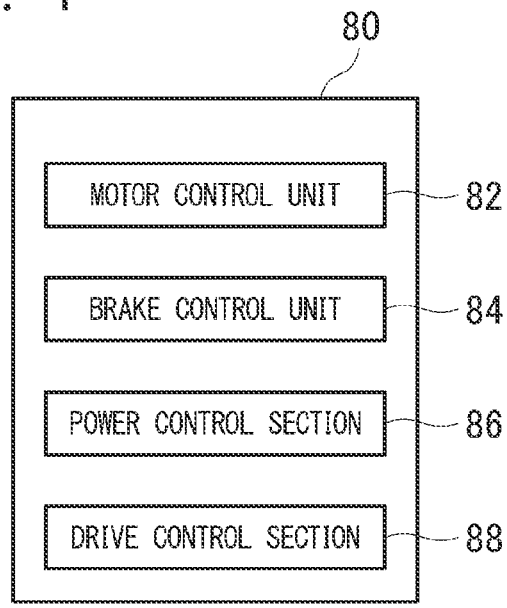
FIG. 4 is a block diagram which shows an example of a configuration of a control unit according to the embodiment.

Next, a configuration example f the control unit 80 when the units 4A and 4B have the control unit 80 (80A and 80B) will be described. FIG. 4 is a block diagram which shows an example of the configuration of the control unit 80 according to the present embodiment. The control unit 80 includes, for example, a motor control unit 82, a brake control unit 84, a power control unit 86, and a traveling control unit 88. When the control unit 80 is not provided, the ECU 100 performs the following control.

The control device controls power supplied to a load different from a drive device from a fuel cell system and a battery based on positional information acquired by the positional information acquisition unit and a traveling route set by the traveling route setting unit.

The motor control unit 82 calculates a driving force required by the motor 12 based on an output of the vehicle sensor 461, and controls the motor 12 such that it outputs the calculated driving force.

The brake control unit 84 calculates a braking force required by the brake device 462 based on the output of the vehicle sensor 461, and controls the brake device 462 such that it outputs the calculated braking force.

The power control unit 86 manages a charging status (a power storage status) of the battery 40. For example, the power control unit 86 calculates a state of charge (SOC; battery charging rate) of the battery 40 based on an output of a battery sensor provided in the battery 40. For example, when the SOC of the battery 40 is less than a predetermined value, the power control unit 86 executes control for charging the battery 40 according to power generation by the fuel cell system 200 or notifies an occupant of information prompting the occupant to perform charging by supplying power from external charging facilities. The power control unit 86 may stop charging control when the SOC of the battery 40 is larger than a predetermined value, or may perform control for consuming surplus power generated by the fuel cell system 200 using an auxiliary machine, and the like.

The traveling control unit 88 executes operation control on the electric vehicle 1 based on, for example, information acquired by the vehicle sensor 461. The traveling control unit 88 may execute the operation control of the electric vehicle 1 based on map information and information acquired from a monitoring unit (not shown) in addition to the information acquired by the vehicle sensor 461. The monitoring unit includes, for example, a camera that captures an image of an external space of the electric vehicle 1, a radar or a light detection and ranging (LIDAR) whose detection range is outside the electric vehicle 1, and an object recognition device or the like that perform sensor fusion processing based on outputs of these. The monitoring unit estimates a type of an object present in the vicinity of the electric vehicle 1 (in particular, a vehicle, a pedestrian, and a bicycle), and outputs the estimated type with position and speed information thereof to the traveling control unit 88. The operation control is, for example, control for causing the electric vehicle 1 to travel by controlling one or both of steering and acceleration or deceleration of the electric vehicle 1.

[ECU]

Figure 5:
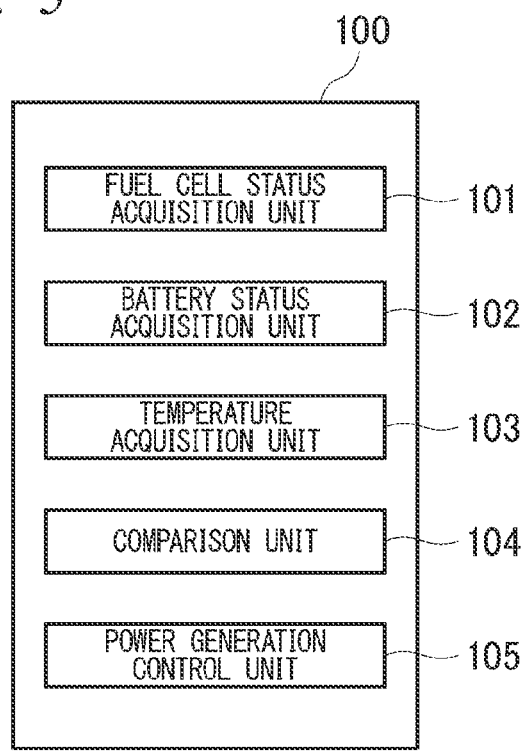
FIG. 5 is a block diagram which shows an example of a configuration of an ECU according to the embodiment.

Next, a configuration example of the ECU 100 will be described. FIG. 5 is a block diagram which shows an example of the configuration of the ECU 100 according to the present embodiment. As shown in FIG. 5, the ECU 100 includes a fuel cell state acquisition unit 101, a battery state acquisition unit 102, a temperature acquisition unit 103, a comparison unit 104, and a power generation control unit 105.

The fuel cell state acquisition unit 101 acquires information on the state of each fuel cell system 200.

The battery state acquisition unit 102 acquires information on the state of the battery 40. The state of the battery 40 includes, for example, information on the temperature of the battery.

The temperature acquisition unit 103 acquires information on the temperature of the fuel cell system 200.

The comparison unit 104 compares the calculated SOC with the threshold value stored by the storage unit 150. The comparison unit 104 compares the calculated required power with the threshold value stored in the storage unit 150. The comparison unit 104 compares a temperature with the threshold value stored by the storage unit 150.

The power generation control unit 105 calculates the required amount of power required by the battery 40 and the fuel cell system 200 based on the output of the vehicle sensor 461. For example, the power generation control unit 105 calculates a torque to be output by the motor 12 based on an accelerator opening and a vehicle speed, and calculates an amount of required power by summing a driving shaft load power obtained based on a torque and the number of rotations of the motor 12 and a power required by the auxiliary machine 46, and the like. For example, the power control unit 86 calculates the SOC of the battery 40 based on an output of the battery sensor included in the battery 40. Note that the power generation control unit 105 may acquire SOC information from the control unit 80. The power generation control unit 105 controls each fuel cell system 200 to be in an on or off state based on a result of comparison by the comparison unit 104. Note that some of processing performed by the power generation control unit 105 may be performed by the control unit 80.

First Example of Vehicle System

Figure 6:
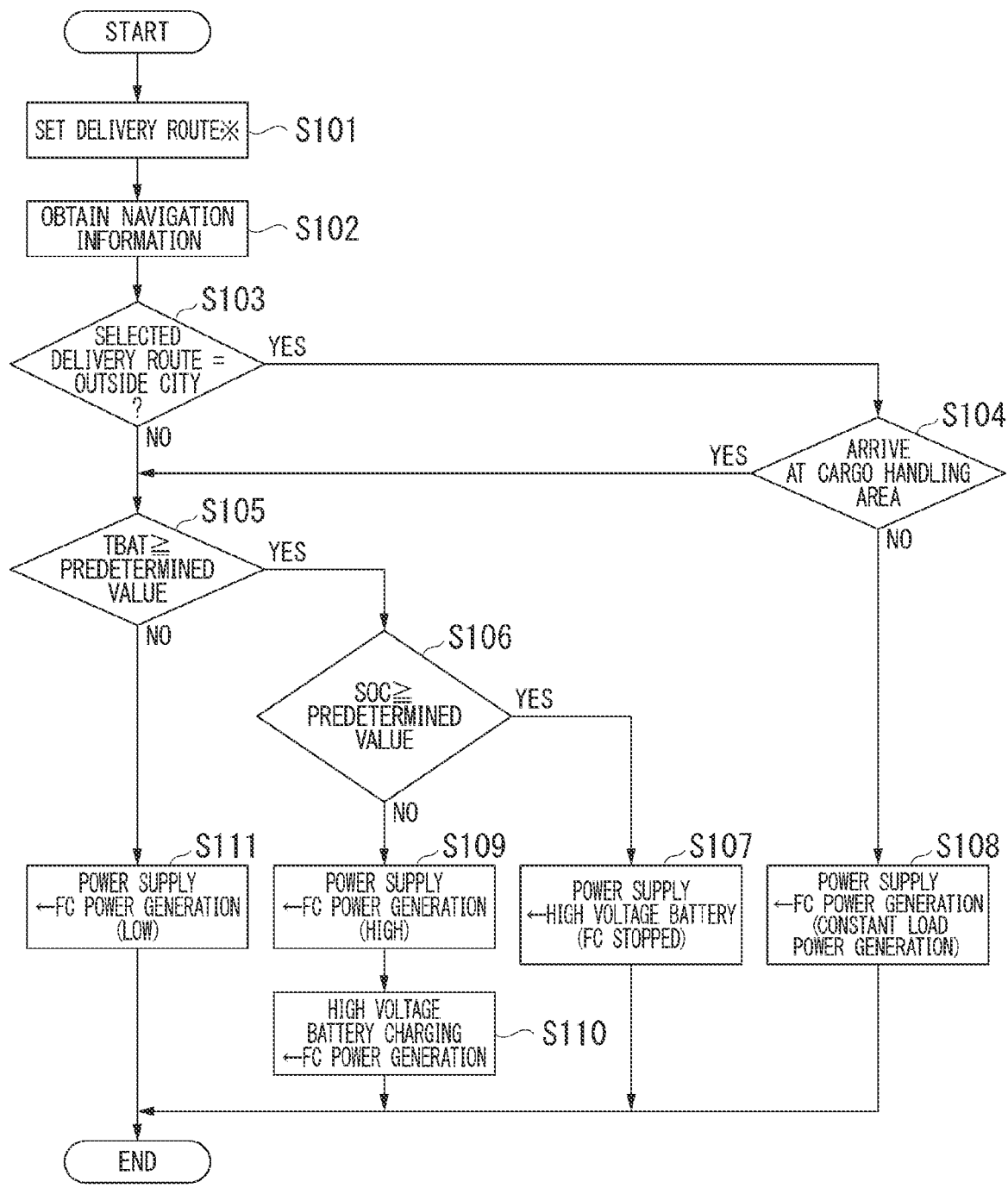
FIG. 6 is a flowchart which shows an example of a processing procedure in a first example of the embodiment.

A first example of the vehicle system according to the embodiment will be described. FIG. 6 is a flowchart which shows an example of a processing procedure in the first example of the embodiment.

In the first example shown in FIG. 6, first, the traveling route setting unit sets a traveling route (a delivery route) (step S101). The traveling route is set to one of an urban route for traveling an urban area and a non-urban route for traveling a non-urban area. The urban route is a route in which traveling and parking or stopping are frequently repeated, and the non-urban route is a route with less frequent parking or stopping.

Next, the positional information acquisition unit acquires positional information (navigation information) of an electric vehicle (step S102). The positional information uses a GPS or the like.

The control unit 80 determines whether a non-urban route is set (selected) as a traveling route (a delivery route) (step S103).

When a non-urban route is selected, the control unit 80 determines whether a cargo handling area (including a break area) is reached based on the traveling route and the positional information (step S104).

When the control unit 80 determines that the cargo handling area (including a break area) is reached, it is determined whether the temperature of the battery (TBAT) acquired by the battery temperature information acquisition unit is equal to or greater than a predetermined value (step S105).

When the temperature of the battery is equal to or greater than a predetermined value, it is determined whether a remaining capacity (SOC) of the battery is equal to or more than a predetermined value (step S106).

When it is determined in step S106 that the SOC of the battery is equal to or more than a predetermined value, the control unit 80 performs control to perform a supply of power to the load from the battery, and stop the fuel cell system (step S107).

When the SOC of the battery is less than a predetermined value, the control unit 80 performs control such that the supply of power to the load is performed from a fuel cell with high power (step S109). Furthermore, the battery is charged with power generated by the fuel cell (step S110).

When it is determined in step S104 that the electric vehicle does not reach the cargo handling area (including a break area), the control unit 80 performs control such that the supply of power to the load is performed by generating power with a constant load from the fuel cell system (step S108).

In step S105, when the temperature of the battery (TBAT) is less than a predetermined value, the supply of power is performed from fuel cell power generation with a low power (step S111).

Second Example of Vehicle System

Figure 7:
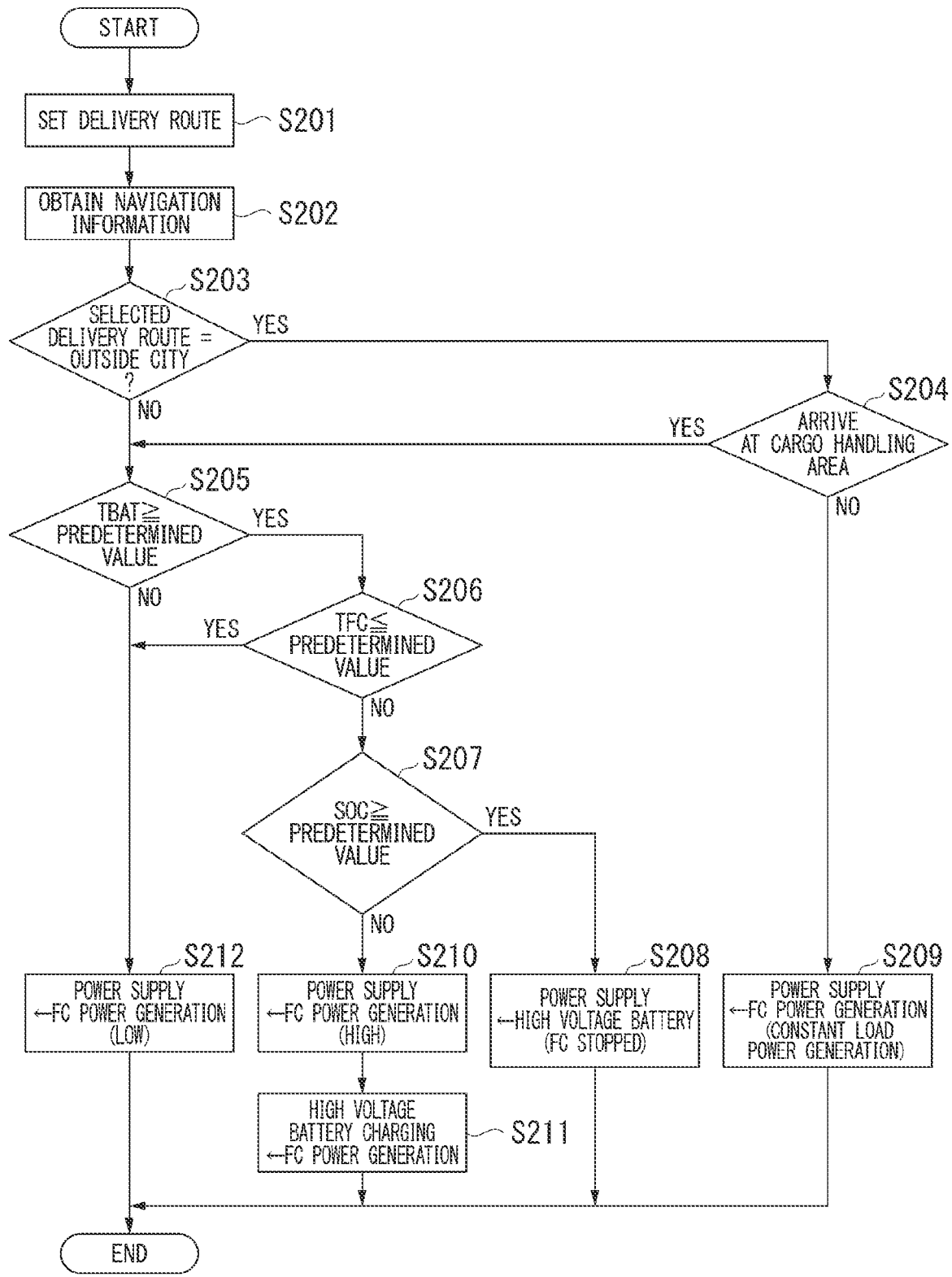
FIG. 7 is a flowchart which shows an example of a processing procedure in a second example of the embodiment.

A second example of the vehicle system according to the embodiment will be described. FIG. 7 is a flowchart which shows an example of a processing procedure in the second example of the embodiment.

In the second example shown in FIG. 7, first, the traveling route setting unit sets a traveling route (a delivery route) (step S201). The traveling route is set to one of an urban route for traveling an urban area and a non-urban route for traveling a non-urban area. The urban route is a route in which traveling and parking or stopping are frequently repeated, and the non-urban route is a route with less frequent parking or stopping.

Next, the positional information acquisition unit acquires the positional information (navigation information) of the electric vehicle (step S202). The positional information uses the GPS or the like.

The control unit 80 determines whether a non-urban route is set (selected) as a traveling route (a delivery route) (step S203).

When a non-urban route is selected, the control unit 80 determines whether a cargo handling area (including a break area) is reached based on the traveling route and the positional information (step S204)

When the control unit 80 determines that the cargo handling area (including a break area) is reached, it is determined whether the temperature of the battery (TBAT) acquired by the battery temperature information acquisition unit is equal to or greater than a predetermined value (step S205).

When the temperature TBAT of the battery is equal to or greater than a predetermined value, it is determined whether a temperature TFC of the fuel cell system is equal to or less than a predetermined value (step S206).

When it is determined in step S206 that the temperature TFC of the fuel cell system is equal to or less than a predetermined value, the control unit 80 performs control such that the supply of power to the load is performed from the fuel cell with low power (step S212).

When it is determined in step S206 that the temperature TFC of the fuel cell system is higher than the predetermined value, it is determined whether the SOC of the battery is equal to or greater than a predetermined value (step S207).

When it is determined in step S207 that the SOC of the battery is equal to or greater than the predetermined value, the control unit 80 performs control to perform the supply of power to the load from the battery and stop the fuel cell (step S208).

When it is determined in step S207 that the SOC of the battery is less than the predetermined value, the control unit 80 performs control such that the supply of power to the load is performed from the fuel power generation with high power (step S210). Furthermore, the battery is charged with power generated by the fuel cell (step S211).

When the cargo handling area (including a break area) is not reached in step S204, the control unit 80 performs control to perform the supply of power by fuel power generation, and generate power with a constant load (step S209).

Third Example of Vehicle System

Figure 8:
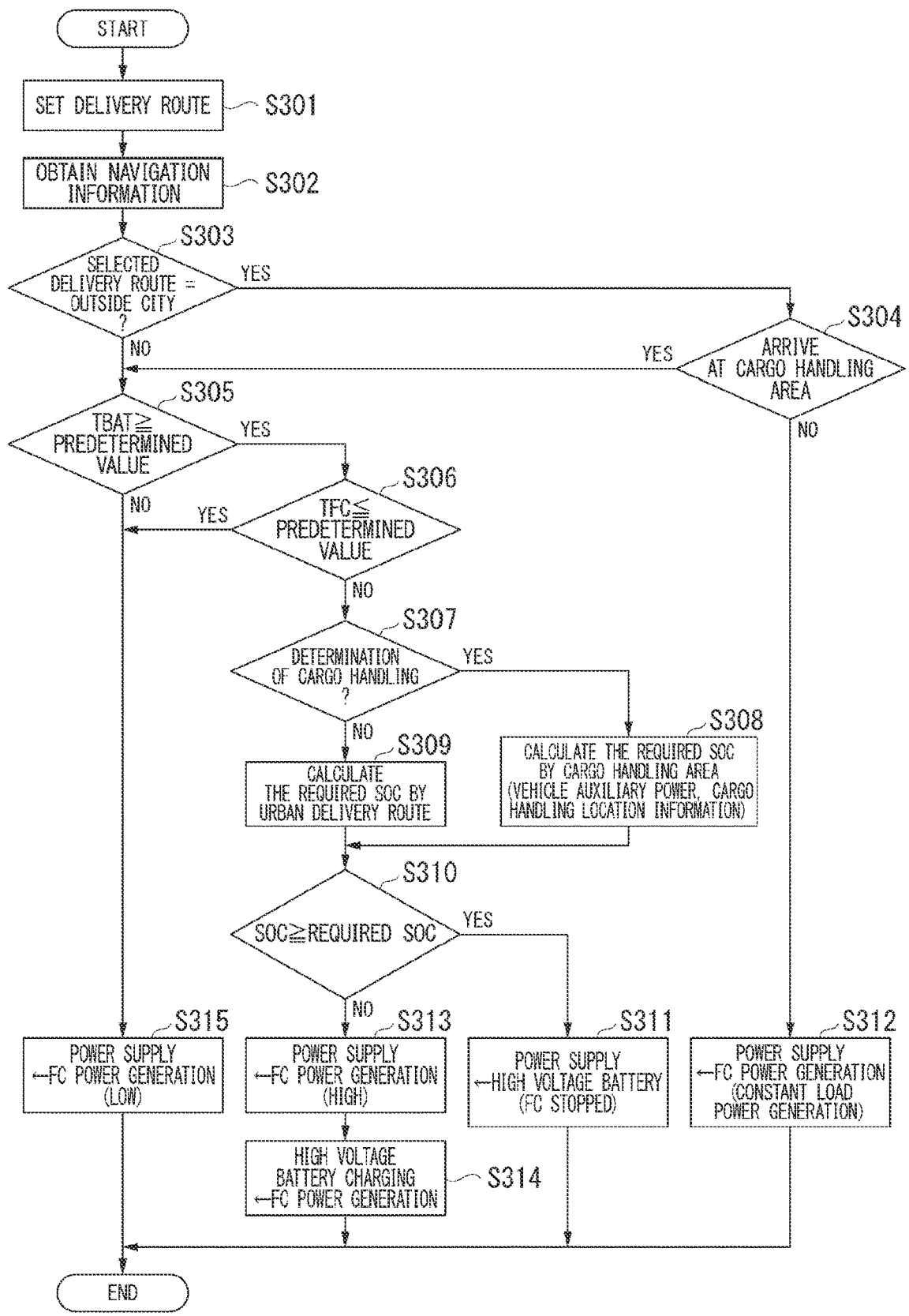
FIG. 8 is a flowchart which shows an example of a processing procedure in a third example of the embodiment.

A third example of the vehicle system according to the embodiment will be described. FIG. 8 is a flowchart which shows an example of a processing procedure in the third example of the embodiment.

In the third example shown in FIG. 8, first, the traveling route setting unit sets a traveling route (a delivery route) (step S301). The traveling route is set to one of an urban route for traveling an urban area and a non-urban route for traveling a non-urban area. The urban route is a route in which traveling and parking or stopping are frequently repeated, and the non-urban route is a route with less frequent parking or stopping.

Next, the positional information acquisition unit acquires positional information (navigation information) of an electric vehicle (step S302). The positional information uses the GPS or the like.

The control unit 80 determines whether the non-urban route is set (selected) as the traveling route (the delivery route) (step S303).

When the non-urban route is selected, the control unit 80 determines whether a cargo handling area (including a break area) is reached based on the traveling route and the positional information (step S304).

When the control unit 80 determines that the cargo handling area (including a break area) is reached, it is determined whether the temperature of the battery (TBAT) acquired by the battery temperature information acquisition unit is equal to or greater than a predetermined value (step S305).

When the temperature TBAT of the battery is equal to or greater than a predetermined value, it is determined whether the temperature TFC of the fuel cell system is equal to or less than a predetermined value (step S306).

When it is determined in step S306 that the temperature TFC of the fuel cell system is equal to or less than a predetermined value, the supply of power is performed from the fuel cell with low power (step S315).

When it is determined in step S306 that the temperature TFC of the fuel cell system is higher than the predetermined value, it is determined whether the cargo handling area (including a break area) is determined to be reached in S304 (step S307).

In step S307, when it is determined in step S304 that the cargo handling area (including a break area) is reached, the control unit 80 calculates a required SOC for each cargo handling area (including a break area) (step S308).

In step S307, when it is determined in step S304 that the cargo handling area (including a break area) is not reached, the control unit 80 calculates a required SOC for each urban delivery route (step S309).

Next to step S308 or step S309, it is determined whether the SOC of the battery is equal to or greater than the required SOC (step S310).

When it is determined in step S310 that the SOC of the battery is equal to or greater than the required SOC, the control unit 80 performs control such that the supply of power to the load is performed from the battery (step S311).

When it is determined in step S310 that the SOC of the battery is less than the required SOC, the control unit 80 performs control such that the supply of power to the load is performed from the fuel cell system with high power (step S313). Furthermore, the battery is charged with power generated by a fuel cell with high power (step S314).

When it is determined in step S304 that the electric vehicle does not reach the cargo handling area (including a break area), the control unit 80 performs control such that the supply of power to the load is performed by generating power with a constant load from the fuel cell system (step S312).

Fourth Example of Vehicle System

Figure 9:
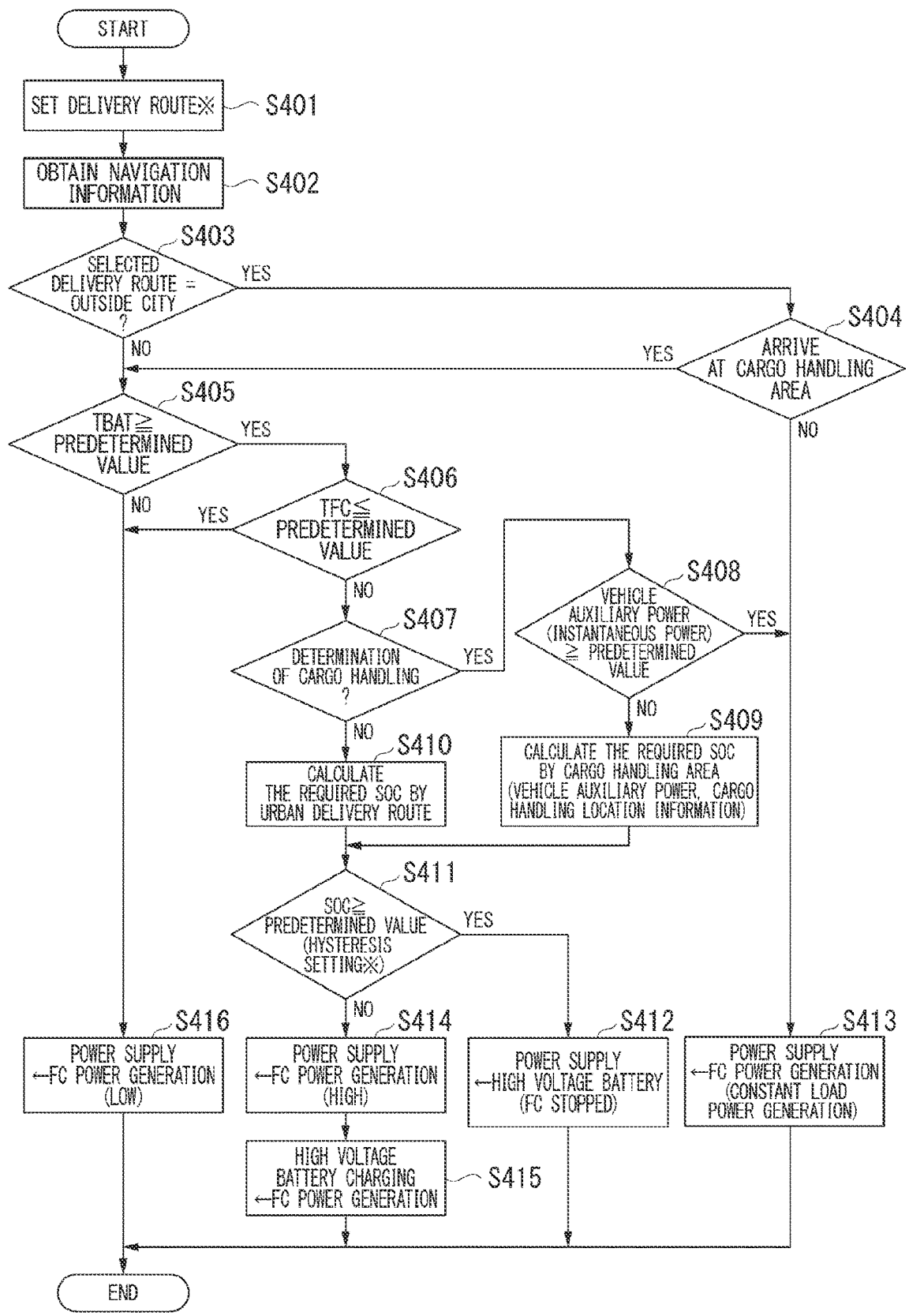
FIG. 9 is a flowchart which shows an example of a processing procedure in a fourth example of the embodiment.

A fourth example of the vehicle system according to the embodiment will be described. FIG. 9 is a flowchart which shows an example of a processing procedure in the fourth example of the embodiment.

In the fourth embodiment shown in FIG. 9, first, the traveling route setting unit sets a traveling route (a delivery route) (step S401). The traveling route is set to one of an urban route for traveling an urban area and a non-urban route for traveling a non-urban area. The urban route is a route in which traveling and parking or stopping are frequently repeated, and the non-urban route is a route with less frequent parking or stopping.

Next, the positional information acquisition unit acquires positional information (navigation information) of an electric vehicle (step S402). The positional information uses the GPS or the like.

The control unit 80 determines whether the non-urban route is set (selected) as the traveling route (the delivery route) (step S403).

When the non-urban route is selected, the control unit 80 determines whether a cargo handling area (including a break area) is reached based on the traveling route and the positional information (step S404).

When the control unit 80 determines that the cargo handling area (including a break area) is reached, it is determined whether the temperature of the battery (TBAT) acquired by the battery temperature information acquisition unit is equal to or greater than a predetermined value (step S405).

When the temperature TBAT of the battery is equal to or greater than a predetermined value, it is determined whether the temperature TFC of the fuel cell system is equal to or less than a predetermined value (step S406).

When it is determined in step S406 that the temperature TFC of the fuel cell system is equal to or less than a predetermined value, the supply of power is performed from the fuel cell with low power (step S416).

When it is determined in step S406 that the temperature TFC of the fuel cell system is higher than the predetermined value, it is determined whether the cargo handling area (including a break area) is determined to be reached in S404 (step S407).

In step S407, when it is determined in step S404 that the cargo handling area (including a break area) is reached, the control unit 80 determines whether vehicle standby power (instantaneous power) is equal to or greater than a predetermined value (step S408).

When it is determined in step S408 that the vehicle standby power (instantaneous power) is equal to or greater than the predetermined value, the control unit 80 performs control such that the supply of power to the load is performed by generating power with a constant load from a fuel cell (step S413).

When it is determined in step S408 that the vehicle standby power (instantaneous power) is less than the predetermined value, the control unit 80 calculates a required SOC for each cargo handling area (including a break area) (step S409).

In step S307, when it is determined in step S304 that the cargo handling area (including a break area) is not reached, the control unit 80 calculates a required SOC for each urban delivery route (step S309).

In step S407, when it is determined in step S404 that the cargo handling area (including a break area) is not reached, the control unit 80 calculates a required SOC for each urban delivery route (step S410).

Next to step S409 or step S410, it is determined whether the SOC of the battery is equal to or greater than a predetermined value (step S411).

When it is determined in step S411 that the SOC of the battery is equal to or greater than the predetermined value, the control unit 80 performs control such that the supply of power to the load is performed from the battery and the fuel cell system is stopped (step S412).

When it is determined in step S411 that the SOC of the battery is less than a predetermined value, the control unit 80 performs control such that the supply of power to the load is performed from the fuel cell system with high power (step S414). Furthermore, the battery is charged with power generated by a fuel cell with high power (step S415).

When it is determined in step S404 that the electric vehicle does not reach the cargo handling area (including a break area), the control unit 80 performs control such that the supply of power to the load is performed by generating power with a constant load from the fuel cell system (step S413).

When the remaining capacity of the battery is lower than a predetermined remaining capacity set based on the positional information acquired by the positional information acquisition unit, an output of the fuel cell system may be higher than an output at which efficiency of the fuel cell system is maximized A relationship between a power generation efficiency and an amount of power generation (generated power) of a general fuel cell system is as shown in FIG. 3 of Japanese Unexamined Patent Application, First Publication No. 2014-056771. That is, the amount of power generation (generated power) of the fuel cell stack is restricted so that the efficiency at the time of power generation of the entire fuel cell system is within a predetermined efficiency range including the maximum value.

Specific Example

Figure 10:
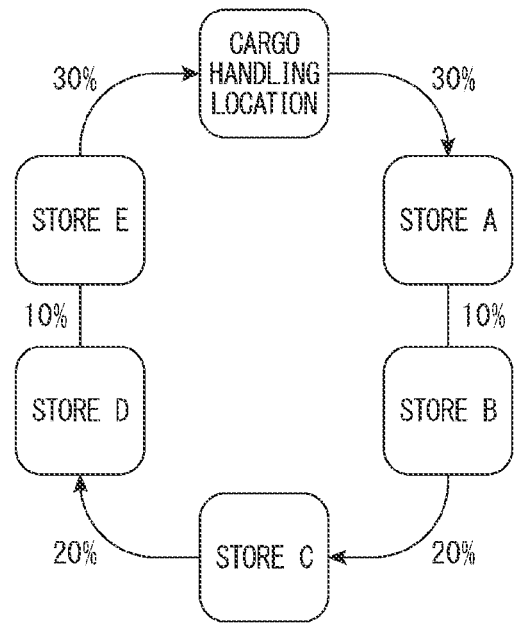
FIG. 10 is an image of a required SOC calculation for an urban delivery route in an example of the embodiment.

FIG. 10 is an image of a required SOC calculation for an urban delivery route. This is an example of returning to a cargo handling place after going around stores A to E from the cargo handling place. The required SOC in each section is shown.

Figure 11:
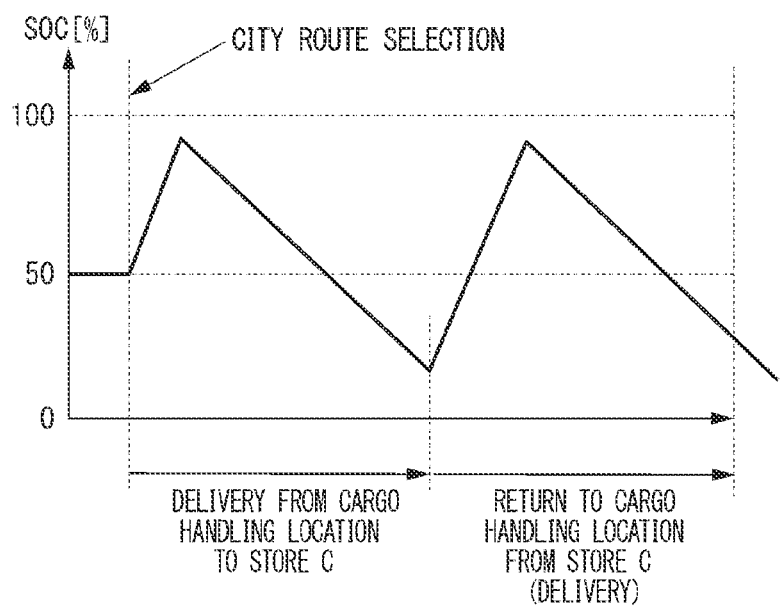
FIG. 11 is a traveling image shown when an urban route is selected in the example of the embodiment.

FIG. 11 is a traveling image shown when an urban route is selected. The horizontal axis represents time, and the vertical axis represents the SOC of the battery.

Figure 12:
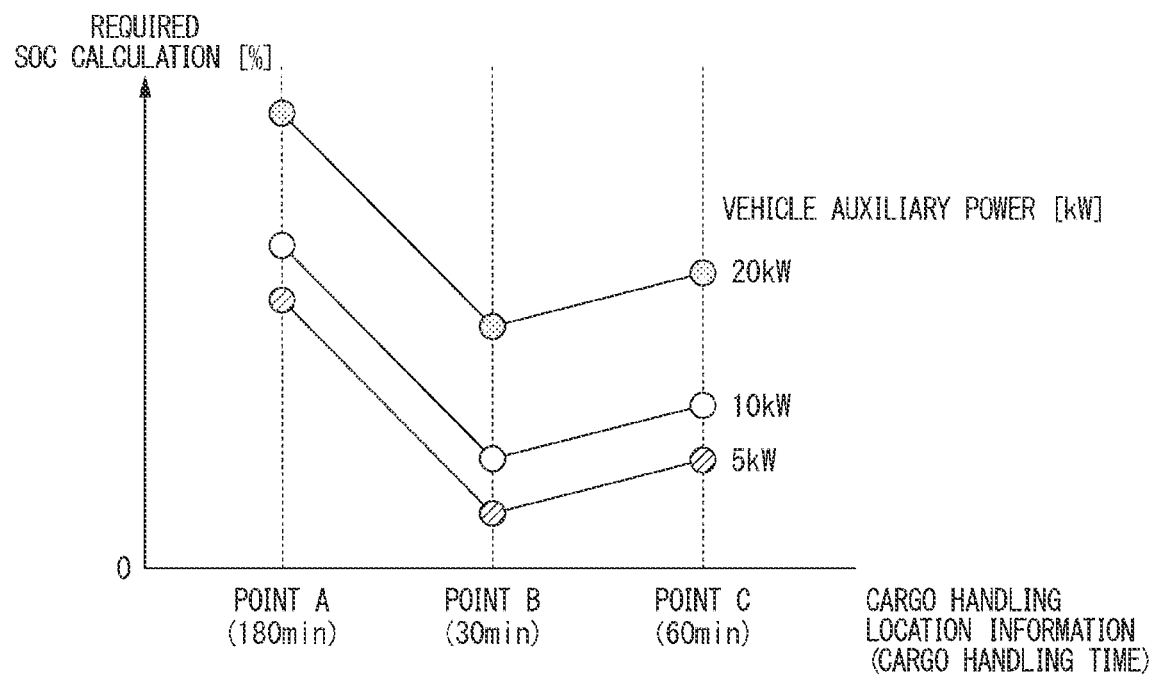
FIG. 12 is an image of a required SOC calculation for each cargo handling area (including a break area) in the example of the embodiment.

FIG. 12 is an image of the required SOC calculation for each cargo handling area (including a break area). The horizontal axis represents time, and the vertical axis represents the required SOC.

As a result, according to the present embodiment, it is possible to improve drive control of the fuel cell system when power is supplied to the load different from a drive device, and to suppress deterioration in durability performance of the fuel cell system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Electric vehicle
2 Cab bag
3 Transmission
4 Unit
4A Unit
4B Unit
5 Shaft
6 Frame
7 Vehicle wheel
12 Monitor
12A Motor
12B Motor
32 Conversion unit
32A Conversion unit
32B Conversion unit
34 BATVCU
34A BATVCU
34B BATVCU
40 Battery
40A Battery
40B Battery
45 DC-DC Conversion unit
45A DC-DC Conversion unit
45B DC-DC Conversion unit
46 Auxiliary machine
46A Auxiliary machine
46B Auxiliary machine
80 Control unit
80A Control unit
80B Control unit
82 Motor control unit
84 Brake control unit
86 Power control unit
88 Traveling control unit
101 Fuel cell state acquisition unit
102 Battery state acquisition unit
103 Temperature acquisition unit
104 Comparison unit
104 Step
105 Power generation control unit
105 Step
110 Step
111 Step
150 Storage unit
200 Fuel cell system
200A Fuel cell system
200B Fuel cell system
200C Fuel cell system
200D Fuel cell system
201 Fuel cell
201A Fuel cell
201B Fuel cell
201C Fuel cell
201D Fuel cell
210 Fuel cell stack
210A Anode
210B Cathode
212a Cathode supply port
212b Cathode discharge port
212c Anode supply port
212d Anode discharge port
214 Compressor
216 Sealing inlet value
218 Humidifier
220 Gas-liquid separator
222 Exhaust circulation pump
226 Hydrogen tank
228 Hydrogen supply valve
230 Hydrogen circulation unit
232 Gas-liquid separator
240 Temperature sensor
242 Contactor
246 Fuel cell control device
248 Output terminal
250 Oxidant gas supply path
252 Oxidant gas discharge path 254 Exhaust gas recirculation path
256 Fuel gas supply path
258 Fuel gas discharge path
262 Exhaust path
264 Drain pipe
280 Fuel cell cooling system
461 Vehicle sensor
461A Vehicle sensor
461B Vehicle sensor
462 Brake device
462A Brake device
462B Brake device

What is claimed is:

1. A vehicle system comprising:
a fuel cell system;
a battery;
a drive device that operates with power;
a load different from the drive device;
a positional information acquisition unit; and
a control device configured to control power to be supplied to the load from the fuel cell system and the battery based on positional information acquired by the positional information acquisition unit and a determined traveling route,
wherein a route is set as an urban route where the determined traveling route repeats driving and parking more than a predetermined number of times,
a non-urban route is set as a route where the determined traveling route repeats driving and parking less than the predetermined number of times,
wherein the vehicle system further comprising a battery temperature information acquisition unit configured to acquire temperature information of the battery,
wherein when an urban route is set, and a temperature of the battery acquired by the battery temperature information acquisition unit is lower than a set predetermined temperature, power is supplied to the load from both of the fuel cell system and the battery, and
when a non-urban route is set, power is supplied to the load from the fuel cell system and the fuel cell system is controlled to have a predetermined amount of power generation.

2. The vehicle system according to claim 1, wherein the determined traveling route is one of the urban route for traveling in an urban area and the non-urban route for traveling in a non-urban area.

3. The vehicle system according to claim 2,
wherein, when the urban route for traveling in the urban area is set, and the temperature of the battery is equal to or higher than the set predetermined temperature, an operating status of the fuel cell system is changed according to a remaining capacity of the battery.

* * * * *